United States Patent
Bayramian

(10) Patent No.: US 8,233,511 B2
(45) Date of Patent: Jul. 31, 2012

(54) METHOD AND SYSTEM FOR MODULATION OF GAIN SUPPRESSION IN HIGH AVERAGE POWER LASER SYSTEMS

(75) Inventor: Andrew James Bayramian, Manteca, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 196 days.

(21) Appl. No.: 12/782,534

(22) Filed: May 18, 2010

(65) Prior Publication Data

US 2011/0286480 A1 Nov. 24, 2011

(51) Int. Cl.
*H01S 3/00* (2006.01)

(52) U.S. Cl. ............... 372/33; 372/8; 372/30; 372/103

(58) Field of Classification Search ............. 372/8, 30, 372/33

See application file for complete search history.

(56) References Cited

U.S. PATENT DOCUMENTS

| | | | |
|---|---|---|---|
| 7,439,477 B2 * | 10/2008 | Eda et al. .................. | 250/201.2 |
| 2008/0165414 A1 * | 7/2008 | Gray ............................ | 359/350 |
| 2011/0180521 A1 * | 7/2011 | Quitter et al. ............. | 219/121.73 |

OTHER PUBLICATIONS

Celliers et al., "Spatial filter pinhole for high-energy pulsed lasers," Appl Opt. Apr. 20, 1998;37(12):2371-2378.
Ireland, "A pinhole plasma shutter for optical isolation in high-power glass lasers," J. Phys. D: Appl. Phys, 1980;13(1): 9-16.
McMahon et al., "A glass-disk-laser amplifier," IEEE J. Quantum Electron, Oct. 1973; QE-9(10):992-999.
Murray et al., "Spatial filter pinhole development for the National Ignition Facility," Appl Opt. Mar. 20, 2000;39(9):1405-1420.
Swain et al., "Large-Aperture Disk Laser System," J. Appl. Phys. Sep. 1969; 40(10): 3973-3977.
Trenholme, John B., "Fluorescence Amplification and Parasitic Oscillation Limitations in Disk Lasers," Naval Research Laboratory Report 2480, Jul. 1972; 70 pages total.
U.S. Appl. No. 12/544,988, filed Aug. 20, 2009; first named inventor: Alvin Charles Erlandson.

* cited by examiner

*Primary Examiner* — Dung Nguyen
(74) *Attorney, Agent, or Firm* — Kilpatrick Townsend & Stockton

(57) ABSTRACT

A high average power laser system with modulated gain suppression includes an input aperture associated with a first laser beam extraction path and an output aperture associated with the first laser beam extraction path. The system also includes a pinhole creation laser having an optical output directed along a pinhole creation path and an absorbing material positioned along both the first laser beam extraction path and the pinhole creation path. The system further includes a mechanism operable to translate the absorbing material in a direction crossing the first laser beam extraction laser path and a controller operable to modulate the second laser beam.

19 Claims, 5 Drawing Sheets

METHOD AND SYSTEM FOR MODULATION OF GAIN SUPPRESSION IN HIGH AVERAGE POWER LASER SYSTEMS

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

High peak power solid-state laser and high power pulsed amplifiers, which are characterized by a relatively high gain, typically need a means of defeating the naturally occurring transverse gain that can lead to losses from amplified spontaneous emission (ASE). Background information on such deleterious ASE can be found in "Fluorescence Amplification and Parasitic Oscillation Limitations in Disk Lasers", by J. B. Trenholme, *NRL Memorandum Rep.* 2480, July, 1972; J. E. Swain, et al., *J. Appl. Phys.*, 40, p. 3973 (1969); and J. M. McMahon et al., *IEEE J. Quantum Electron.* QE-9, p. 992 (1973).

A technique that has been utilized to suppress ASE and to suppress the onset of parasitic oscillations involves bonding a designed absorbing material to the edges of the gain medium (i.e., an edge cladding). If the index of refraction of the bonded absorbing material substantially matches that of the gain medium, a substantial portion of the ASE is coupled out of the gain media and into the absorbing material before it can build sufficiently to depopulate the excited state and thus reduce or clamp the gain. Despite the benefits provided by edge claddings, there is a need in the art for improved methods and systems for gain isolation.

SUMMARY OF THE INVENTION

According to the present invention, techniques related to optical systems are provided. More particularly, embodiments of the present invention relate to methods and systems for reducing ASE in high power laser/amplifier systems. In a particular embodiment, a thin, opaque, moveable membrane is disposed at a position along an extraction beam path of the high power laser/amplifier system to isolate the gain and reduce the ASE. A series of pinholes are formed sequentially in the moveable membrane (e.g., a ribbon of membrane material in a reel-to-reel system) to enable the laser output pulse to be generated or an amplified pulse to pass along the extraction beam path. In a specific embodiment, the pinhole formation is timed to precede the arrival of the laser extraction pulse, providing a single use pinhole as the membrane material advances to expose a virgin piece of membrane material. The methods and systems described herein are also applicable to other amplifier and laser systems.

According to an embodiment of the present invention, a high average power laser system with modulated gain suppression is provided. The system includes an input aperture associated with a first laser beam extraction path and an output aperture associated with the first laser beam extraction path. The system also includes a pinhole creation laser having an optical output directed along a pinhole creation path, an absorbing material positioned along both the first laser beam extraction path and the pinhole creation path, and a mechanism operable to translate the absorbing material in a direction crossing the first laser beam extraction laser path, the system further includes a controller operable to modulate the second laser beam.

According to another embodiment of the present invention, a method of operating a first laser is provided. The method includes providing the first laser having an optical cavity and disposing an absorbing material in the optical cavity. The method also includes providing a second laser and directing a beam from the second laser to impinge on the absorbing material. The method further includes vaporizing a portion of the absorbing material, forming a pinhole in the optical cavity, and outputting a laser pulse from the first laser.

According to yet another embodiment of the present invention, a method of providing modulated gain suppression for a high average power laser system is provided. The method includes providing a first laser beam path associated with a first pulsed laser system, providing a first portion of an absorbing material disposed in the first laser beam path, and pulsing the first pulsed laser system to generate a first pulse propagating along the first laser beam path. The method also includes vaporizing the first portion of the absorbing material to generate a plasma shutter at a pinhole location along the first laser beam path, dissipating the plasma shutter, and forming at pinhole at the pinhole location. The method further includes passing at least a portion of the first pulse through the pinhole location and translating the absorbing material to position a second portion of the absorbing material at the pinhole location.

Numerous benefits are achieved by way of the present invention over conventional techniques. For example, the present techniques provide a method to reduce the level of ASE present in a laser/amplifier system. Moreover, embodiments of the present invention provide laser/amplifier systems that produce high average power pulses. Furthermore, embodiments of the present invention provide.

Embodiments of the present invention provide enabling technology for a new class of laser systems that are not currently possible. Many applications can benefit from the lasers/amplifiers described herein including the Tailored Aperture Ceramic Laser (TACL) used as a pulse amplifier, defense applications utilizing high power lasers, space debris clearing using lasers, inertial confinement fusion laser drivers, high power laser peening systems, and average power petawatt laser systems for radiation production (including high average power chirped pulse laser systems).

These and other objects and features of the present invention and the manner of obtaining them will become apparent to those skilled in the art, and the invention itself will be best understood by reference to the following detailed description read in conjunction with the accompanying drawings.

DETAILED DESCRIPTION OF SPECIFIC EMBODIMENTS

Figure 1:
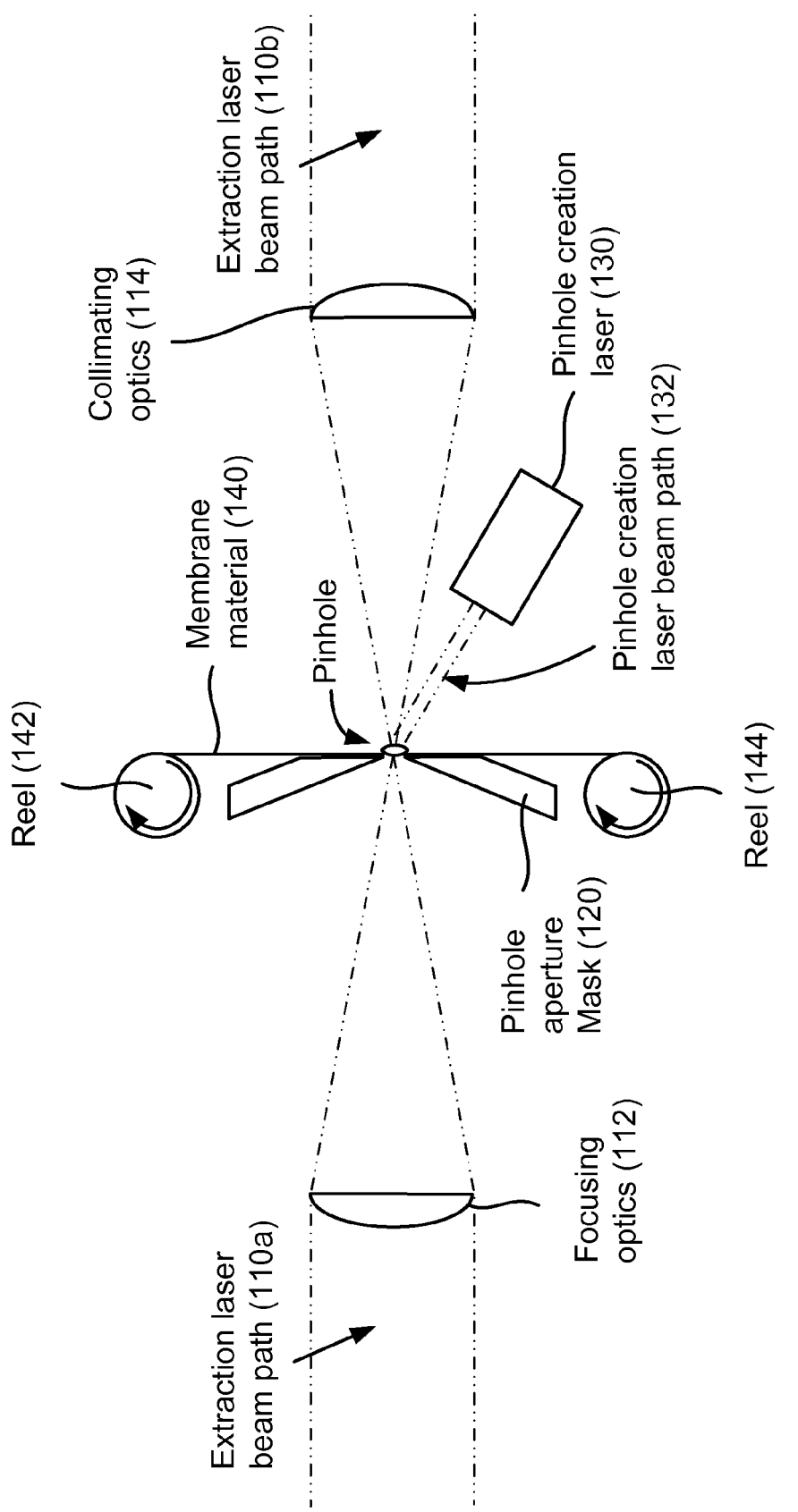
FIG. 1 is a simplified schematic diagram illustrating a reel-to-reel modulated pinhole system according to an embodiment of the present invention.

High power pulsed amplifiers typically require some kind of gain isolation to prevent amplified spontaneous emission (ASE) from extracting the stored energy before the desired pulse propagates through the amplifier. In some systems, a switch, such as a Pockels cell, acousto-optic modulator, or Faraday isolator is used to provide this gain isolation. High power pulsed amplifiers and high power lasers also typically require some level of spatial filtering to maintain the spatial mode of the beam (i.e., the beam quality). High beam quality is desirable because minimal modulation of the spatial profile of the beam enables the ability to focus the beam to a tight spot.

Conventional solutions to providing gain isolation are hampered by their inability to operate at high average power (e.g., greater than 1 kW) without severe depolarization or damage. From the gain isolation standpoint, the Pockels cells and Faraday isolators have absorption at high power that induces thermal birefringence. The thermal birefringence destroys the polarization state (and gain suppression) and eventually results in thermally induced catastrophic optical damage (i.e., thermally induced stress fracture).

Acousto-optic modulators only work at low power. Since the switching time of the acousto-optic modulator is related to the acoustic transit time across the beam aperture, fast switching times (on the order of hundreds of nanoseconds) requires the beam to be focused through the material at high energies, resulting in material damage. Thus, to achieve fast switching speeds, which is associated with efficient gain extraction, the apertures are limited to a few millimeters in size, resulting in high power densities and optical damage for extraction pulse energies above a few Joules.

A saturable absorber functions by absorbing a fraction of the light propagating through the system (including ASE and other parasitic light) until the material absorption saturates, effectively making the material "transparent". Exemplary saturable absorbers are chromium doped YAG (Cr:YAG) and semiconductor saturable absorber mirrors (SESAMs). Unfortunately, saturable absorbers are never truly transparent and continue to absorb some fraction of the light propagating through them, even when they are optically bleached. For high average power applications, the consequence of this absorption is a very large heat load in the materials, loss to the laser amplifier, and ultimately thermal-stress induced or optical absorption induced damage.

Stimulated Brillouin Scattering (SBS) mirrors have the potential to isolate gain, but are characterized by several disadvantages: the energy that can be coupled into an SBS cell is limited (by damage), which restricts the placement of the SBS mirror in the laser/amplifier architecture; the laser/amplifier must be narrowband for SBS mirrors to be effective; and SBS mirrors do not preserve pulse shaping.

In low power applications, it is possible to use pinholes to provide for spatial filtering and beam cleanup, however, the use of pinhole spatial filters with high power lasers and/or amplifiers results in pinhole closure, in which the beam's electric field at the pinhole exceeds the breakdown threshold in air, resulting in plasma generation at the pinhole and the absorption or refraction of the laser light. Refraction by plasmas is harmful as the plasma tends to be nonuniform, causing wavefront distortion of the laser beam. Pinhole closure also occurs when the laser-beam intensity at the edge of the pinhole is sufficient to ablate material into the laser beam, where the ablated material may also be turned into plasma. Pinhole closure from the breakdown of air causes immediate pinhole closure, while pinhole closure from ablated material occurs after a period of several tens of nanoseconds, sufficient for the ablated material to travel into the beam. The absorption or refraction of the laser beam by the plasma or ablated material prevents the propagation of long pulses (e.g., longer than the pinhole closure time of tens of nanoseconds) through the pinhole. Additionally, in a pulsed application, if the plasma is not dissipated before arrival of the next laser pulse, this subsequent pulse can experience absorption or refraction in the plasma, impairing pulsed applications in addition to long-pulse applications.

As discussed in copending and commonly assigned U.S. patent application Ser. No. 12/544,988, filed on Aug. 20, 2009, entitled "Spatial Filters for High Average Power Lasers", the disclosure of which is hereby incorporated by reference in its entirety, rather than circular pinholes, a spatial filter can be provided that uses relay telescopes with cylindrical lenses to reduce the beam intensity formed at a "line" focus, rather than the higher intensity "point" focus created using spherical optics. As described in the above-referenced application, a "line" focus can provide a light intensity less than the vaporization threshold for the material from which the spatial filter is fabricated, effectively eliminating pinhole erosion. Another approach to forming spatial filters is near field spatial filtering, in which volume Bragg gratings are used to filter out beam modulation in the near field. Possible issues associated with this solution include the development of a new material suitable for forming the volume Bragg gratings, potential transmission losses, and optical damage.

For high power lasers and high power pulse amplifiers, collectively referred to as high power laser/amplifier systems, it is desirable to prevent the system from lasing off of its own spontaneous emission. Currently, because of the issues with gain isolation discussed above, high energy, high average power laser systems operating at greater than 10 kW operate in a quasi-continuous wave (quasi-CW) or continuous wave (CW) mode of operation in which spontaneous emission is amplified in a long pulse or where the pulse repetition frequency is very high, effectively limiting the buildup of ASE in the laser system. To solve one or more of the problems discussed above, embodiments of the present invention prevent ASE from reducing the gain in high power lasers/amplifiers by implementing modulated gain isolation, which may be considered as a switch.

FIG. 1 is a simplified schematic diagram illustrating a reel-to-reel modulated pinhole system according to an embodiment of the present invention. As illustrated in FIG. 1, an extraction laser beam path 110a and an extraction laser beam path 110b is illustrated. The high power laser output propagates along this beam path. In an embodiment, the extraction laser beam paths 110 and 110b are disposed along an optical path inside a laser resonator. In another embodiment, the extraction laser beam path 110 and 110b is an optical path along which an amplified pulse propagates. Thus, embodiments of the present invention are applicable to both laser and amplifier architectures. As will be evident to one of skill in the art, the reference to the extraction laser beam path is thus in reference to laser light and such laser light can be associated with a high average power pulsed laser or a high average power pulsed amplifier fed by some initial master oscillator input. One of ordinary skill in the art would recognize many variations, modifications, and alternatives.

A thin, opaque, membrane material 140 is disposed in the optical path between the extraction laser beam paths 110a and 110b. The presence of the membrane material 140 in the optical path results in gain suppression since the membrane material completely blocks the laser extraction pathway. For a pulsed laser application, the presence of the membrane material in the optical path increases the round trip cavity loss, preventing lasing due to parasitic oscillations. For a pulse amplifier application, the membrane material increases the loss along the amplification path, reducing the level of ASE and preserving the stored gain, which is confined to the amplifier.

As described below, embodiments of the present invention provide solutions to the issues related to both gain suppression and pinholes at high average power by creating a new pinhole on each shot. In the embodiment illustrated in FIG. 1, pinhole creation laser 130 generates a laser beam along the pinhole creation laser beam path, which intersects the extraction laser beam path 110. The laser pulse from the pinhole creation laser 130 creates a pinhole in the membrane material 140. The pinhole is created at a pinhole location. In an amplifier application, the pinhole is created at a time preceding (substantially immediately) the arrival of the laser extraction pulse. In a laser application, the creation of the pinhole reduces the round trip cavity loss to a level less than the gain, resulting in lasing. After the high average power laser pulse is passed/output, a virgin piece of the membrane material is positioned at the pinhole location, providing the desired gain suppression function. Thus, embodiments of the present invention provide a single use pinhole in the sense, that a new pinhole is created for each laser pulse.

Although the pinhole illustrated in FIG. 1 is of a generally circular shape, this is not required by embodiments of the present invention. In applications in which the membrane material is moved at a constant rate, the shape of the pinhole can be a predetermined shape appropriate to provide the proper spatial filtering as a function of time as the membrane material moves. As an example, the pinhole could be provided in an oval shape, a tapered oval, or the like so that the extraction pulse is filtered as desired. In some implementations, the length of the pulse will be short enough that the motion of the membrane material will be effectively zero. In order to generate the desired pinhole shape, the spatial profile of the pinhole creation laser can be modified using optics to provide the desired spatial profile. One of ordinary skill in the art would recognize many variations, modifications, and alternatives.

Referring to FIG. 1, the membrane material 140 may be provide in a ribbon form that can be moved by the reels 142 and 144. When the desired stored energy in the gain medium is reached, a pinhole forming laser pulse is used to puncture the membrane material at the pinhole location. The laser pulse vaporizes a hole of the desired spatial filter diameter in the membrane material. After the creation of the pinhole at the pinhole location, the reels are turned to position a virgin piece of membrane material at the pinhole location. Pulse by pulse, the membrane material is reeled from reel 142 to reel 144.

Following the pinhole creating laser pulse, there is a plasma expansion immediately surrounding the new pinhole, similar in nature to the plasma shutter described above. Thus, even though a physical pinhole has been formed in the membrane material, the plasma present in and around the pinhole serves to effectively keep the pinhole closed for a period of time. The pinhole opening time is actually minimized by this effect, resulting in pinhole opening times on the order of hundreds of nanoseconds or less. When the plasma is sufficiently quenched, the extraction pulse is allowed to propagate through the newly created pinhole. It should be noted that the edges of the newly formed pinhole will perform a spatial filtering function and it is possible that the edges of the pinhole will be vaporized by the extraction pulse. However, because the plasma formed at the edges as a result of the extraction pulse will be absorbing/scattering, the spatial filtering function is accomplished.

In a specific embodiment, a pinhole is used for multiple high average energy pulses. In this specific embodiment, the multiple high average energy pulses propagating along the extraction path will be engineered such that the multiple pulses pass through the pinhole after the plasma launched by the first of the multiple pulses becomes sufficiently transparent to enable the multiple pulses to pass through the pinhole.

Following the propagation of the high average energy extraction pulse through the pinhole, the membrane material is translated to expose a new, pristine portion of the membrane, which then provides gain suppression for the next high average energy pulse. Referring to FIG. 1, in addition to the pinhole created in the membrane material, a pinhole aperture mask 120 is utilized to block transmission along the extraction laser beam path (e.g., along the telescope formed using the focusing optics 112 and the collimating optics 114) at positions to the sides of the pinhole. In the embodiment illustrated in FIG. 1, the membrane material is stretched over the aperture of the pinhole aperture mask 120 and is translated across the beam path using a reel-to-reel mechanism. One of ordinary skill in the art would recognize many variations, modifications, and alternatives.

In an exemplary embodiment, the size of the pinhole created by the pinhole creation laser beam is on the order of about 0.1 mm to about 1.0 mm. The aperture of the pinhole aperture mask is on the order of about 5 mm. For a high average power laser/amplifier operating at 200 Hz, the ribbon of membrane material will be translated at a rate of about 1 m/s. For reels about 4 cm in radius, the rotation rate of the reels will be on the order of 240 revolutions per minute. The membrane material can be fabricated using variety of materials depending on the particular engineering design. These materials include graphite, carbon fiber, plastic, aluminum, steel, tungsten, or the like. Suitable membrane materials include materials that provide optical absorption at the wavelength(s) of interest and can be vaporized to form a small pinhole using a pulse of energy (e.g., a laser pulse). For some membrane materials, additional mechanical strength is provided by reinforcing the sides of the ribbon with Mylar or other suitable material. As an example, a ribbon of membrane material made using a delicate material could be reinforced by adding strips of Mylar or other reinforcement along the sides of the ribbon, suspending the membrane material between the reinforced sides. Such reinforcement of the ribbon of membrane material allows for proper tensioning and enables high translation rates. Although not illustrated in FIG. 1, a vacuum pump can be placed near the plasma blow-off location associated with the pinhole in order to facilitate telescope cleanliness and conductance time.

Thus, embodiments of the present invention provide a modulated or temporary pinhole that provides gain isolation to hold off the gain at high average power levels and provide solutions for high average power lasers/amplifiers in which Pockels cells depolarize or even fracture due to thermal loading. Referring to FIG. 1, the pulse from the pinhole creation laser propagates off-axis with the extraction laser beam and in a direction substantially opposite to the extraction laser beam. In other embodiments, the pinhole creation laser beam path is substantially in the same direction as the extraction laser. One of ordinary skill in the art would recognize many variations, modifications, and alternatives.

As illustrated in FIG. 1, the surface of the membrane material 140 and the pinhole aperture mask 120 are oriented substantially orthogonal to the axis of the extraction laser beam path 110. In another embodiment, the surface of the membrane material and/or the pinhole aperture mask are oriented at an angle such that ejected plasma resulting from pinhole creation is directed out of the extraction laser beam path. By directing the plasma to a dump, optics such as the focusing optics 112 can be protected from coating by the material vaporized from the membrane material. Moreover, if bidirectional extraction is desired, a second pinhole aperture mask (not illustrated) could be used on the right side of the membrane material as illustrated in FIG. 1, providing a mirror-image position for the second pinhole aperture mask on the other side of the membrane material with respect to the pinhole mirror mask 120.

Figure 2:
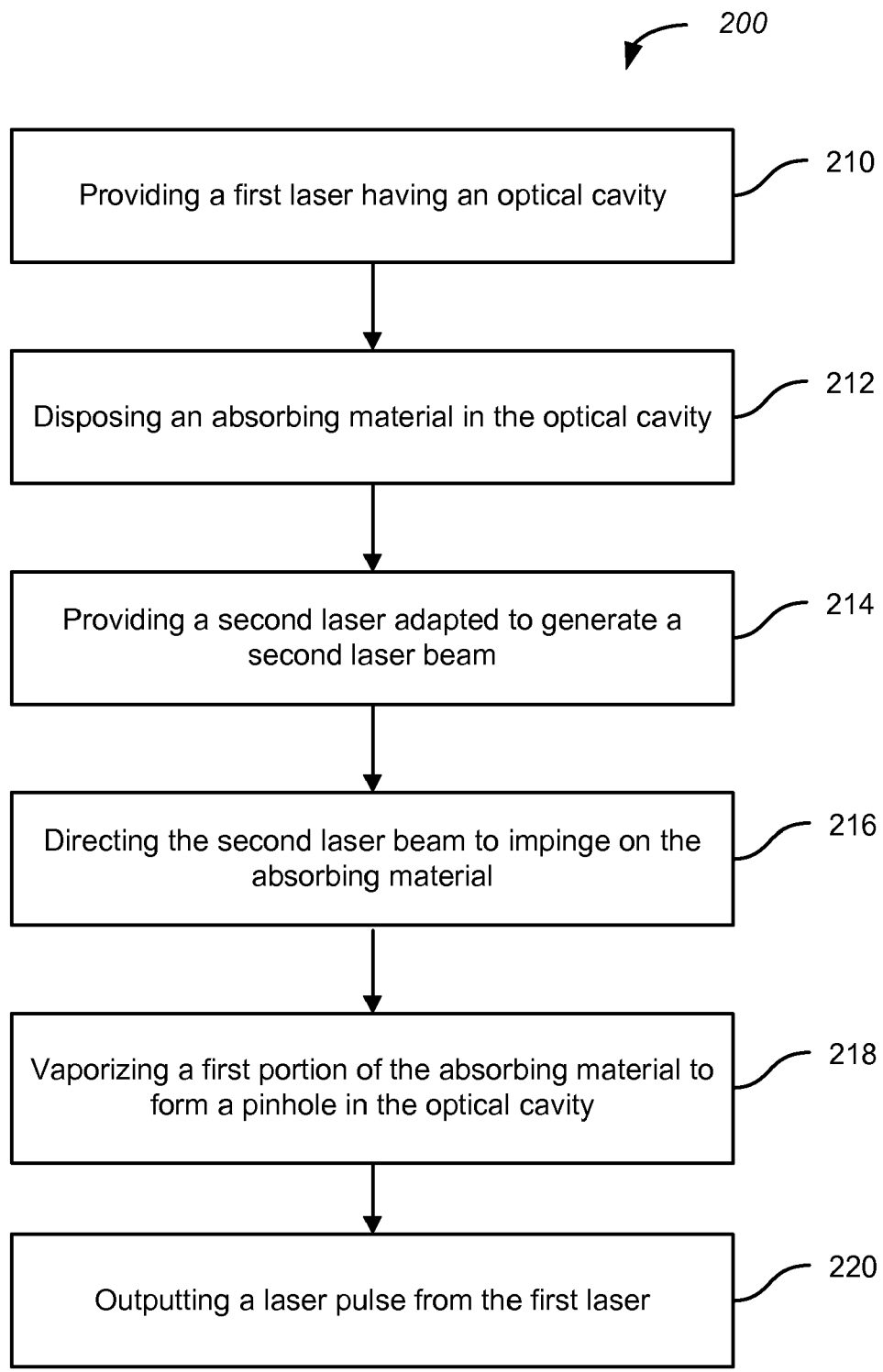
FIG. 2 is a simplified flowchart illustrating a method of operating a first laser according to an embodiment of the present invention.

FIG. 2 is a simplified flowchart illustrating a method of operating a first laser according to an embodiment of the present invention. The method 200 includes providing the first laser having an optical cavity (210). In the embodiment illustrated in FIG. 2, the first laser is a high average power (e.g., greater than 10 KW) pulsed laser. Exemplary lasers include, but are not limited to gain medium comprising Nd:SrF$_2$, Nd:YAG, and the like. Embodiments of the present invention do not have a gain medium selectivity, but are applicable to a wide variety of pulsed lasers. In other embodiments, an amplifier configuration is utilized instead of a laser. One of ordinary skill in the art would recognize many variations, modifications, and alternatives.

The method also includes disposing an absorbing material in the optical cavity (212). The absorbing material is typically provided in the form of a ribbon of a membrane material with a border of a material with high mechanical strength. Exemplary membrane materials are graphite, carbon fiber, plastic, aluminum, steel, tungsten, or the like. The method additionally includes providing a second laser (214), which is referred to herein as a pinhole creation laser. The second laser is adapted to generate a second laser beam, which is directed along a pinhole creation laser beam path. Lasers that can vaporize a portion of the membrane material to form a pinhole are suitable as the second laser, including semiconductor, solid state, gas, or other lasers.

The method further includes directing a beam from the second laser to impinge on the absorbing material (216) and vaporizing a portion of the absorbing material (218). The vaporization of the portion of the absorbing material forms a pinhole in the optical cavity. Typically, the pinhole is characterized by a spatial dimension ranging from about 0.1 mm to about 1.0 mm. The pinhole enables light in the laser cavity to propagate with less loss, resulting in lasing of the laser and generation of a laser pulse as an output from the first laser (220). According to embodiments described herein, the laser is a pulsed laser and the membrane material is translated to introduce a new piece or portion of the membrane material in the optical path and provide gain suppression. Subsequent pulses from the second laser produce a series of sequential pinholes, resulting in a series of output pulses from the first laser. In some embodiments, the average output power of the first laser is on the order of greater than 10 KW. In particular embodiments, average output powers ranging from 1-5 KW, 5-10 KW, 10-20 KW, 20-50 KW, 50-100 KW, 100-500 KW, 500 KW-1 MW, 1 MW-10 MW, or greater are provided.

It should be appreciated that the specific steps illustrated in FIG. 2 provide a particular method of operating a laser according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Although the method discussed in relation to FIG. 2 utilizes two lasers, the high average power laser and the pinhole creation laser, other embodiments utilize a pre-pulse or the leading edge of a high energy pulse traveling through a high average power amplifier to vaporize the membrane material and create the pinhole. In this embodiment, a pre-pulse of the extraction laser itself or a leading edge of the extraction laser itself provides the function served by the pinhole creation laser in the embodiment illustrated in FIG. 2. The pulse shape of the extraction pulse can be modified to provide the appropriate power level to create the desired pinhole, with the latter portions of the pulse being provided as the output. In another alternative embodiment, a different wavelength is propagated along the extraction laser beam path to provide the pinhole creating pre-pulse along the same axis as the extraction laser. In this alternative embodiment, issued related to laser punch-through can be reduced or eliminated.

Figure 3:
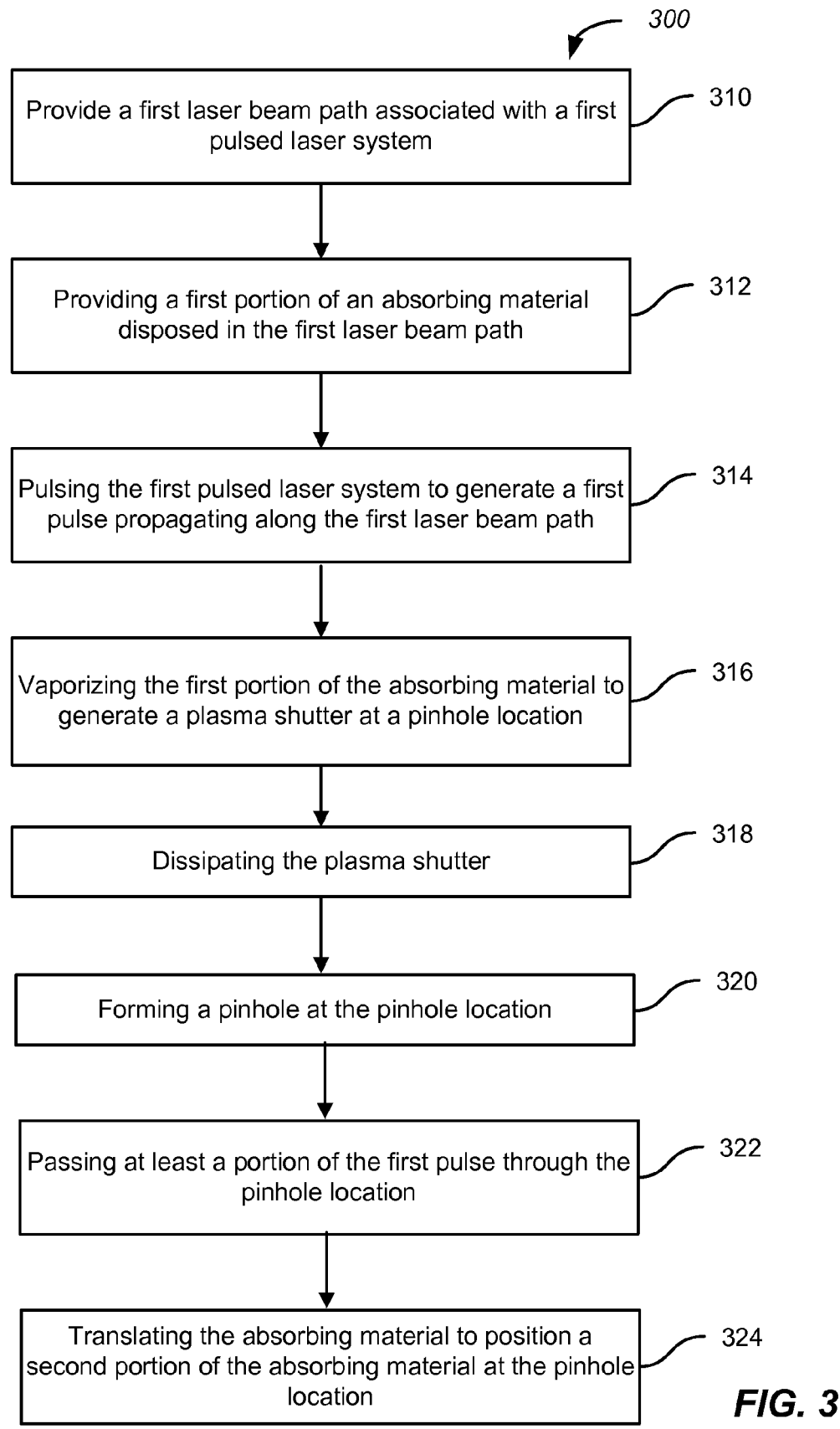
FIG. 3 is a simplified flowchart illustrating another method of providing modulated gain suppression for a high average power laser system according to an embodiment of the present invention.

FIG. 3 is a simplified flowchart illustrating another method of providing modulated gain suppression for a high average power laser system according to an embodiment of the present invention. The method 300 includes providing a first laser beam path associated with a first pulsed laser system (310). The first laser beam path is referred to in FIG. 1 as the extraction laser beam path. The method also includes providing a first portion of an absorbing material disposed in the first laser beam path (312). The absorbing material (e.g., graphite, carbon fiber, plastic, aluminum, steel, or tungsten) can be provided in a reel-to-reel format as illustrated in FIG. 1. The method further includes pulsing the first pulsed laser system to generate a first pulse propagating along the first laser beam path (314). In some embodiments, the first pulsed laser system is a Nd:SrF$_2$ laser with an average power ranging from about 200 KW to about 2 MW.

The method includes vaporizing the first portion of the absorbing material and generates a plasma shutter at a pinhole location along the first laser beam path (316). The plasma shutter persists for a period of time at the pinhole location, resulting in the loss along the optical path remaining at a level to provide gain suppression. The method also includes dissipating the plasma shutter (318) and forming at pinhole at the pinhole location (320). The method further includes passing at least a portion of the first pulse through the pinhole location (322) and translating the absorbing material to position a second portion of the absorbing material at the pinhole location (324). The newly positioned absorbing material reduces the ASE by increasing the system loss, resulting in gain suppression prior to the next high average power output pulse. In one embodiment, the second portion of the absorbing material is positioned at the pinhole location within 10 ms of the formation of the pinhole.

In a particular embodiment, vaporizing the first portion of the absorbing material comprises using a first portion of the first pulse to vaporize the absorbing material or using a pre-pulse to vaporize the absorbing material. The pre-pulse can be one of several (e.g., two) pulses in a train. In this particular embodiment, which is typically applicable to an amplifier arrangement, no external laser is used to create the pinhole. In a specific embodiment, vaporizing the first portion of the absorbing material includes providing a second laser beam path associated with a second pulsed laser system. The second laser beam path intersects the first laser beam path at the pinhole location. Vaporizing the absorbing material in this specific embodiment also includes pulsing the second pulsed laser system to generate a second pulse propagating along the second laser beam path. Thus, embodiments of the present invention can utilize light from the high average power laser to generate the pinhole or light from an external laser.

It should be appreciated that the specific steps illustrated in FIG. 3 provide a particular method of providing modulated gain suppression for a high average power laser system according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
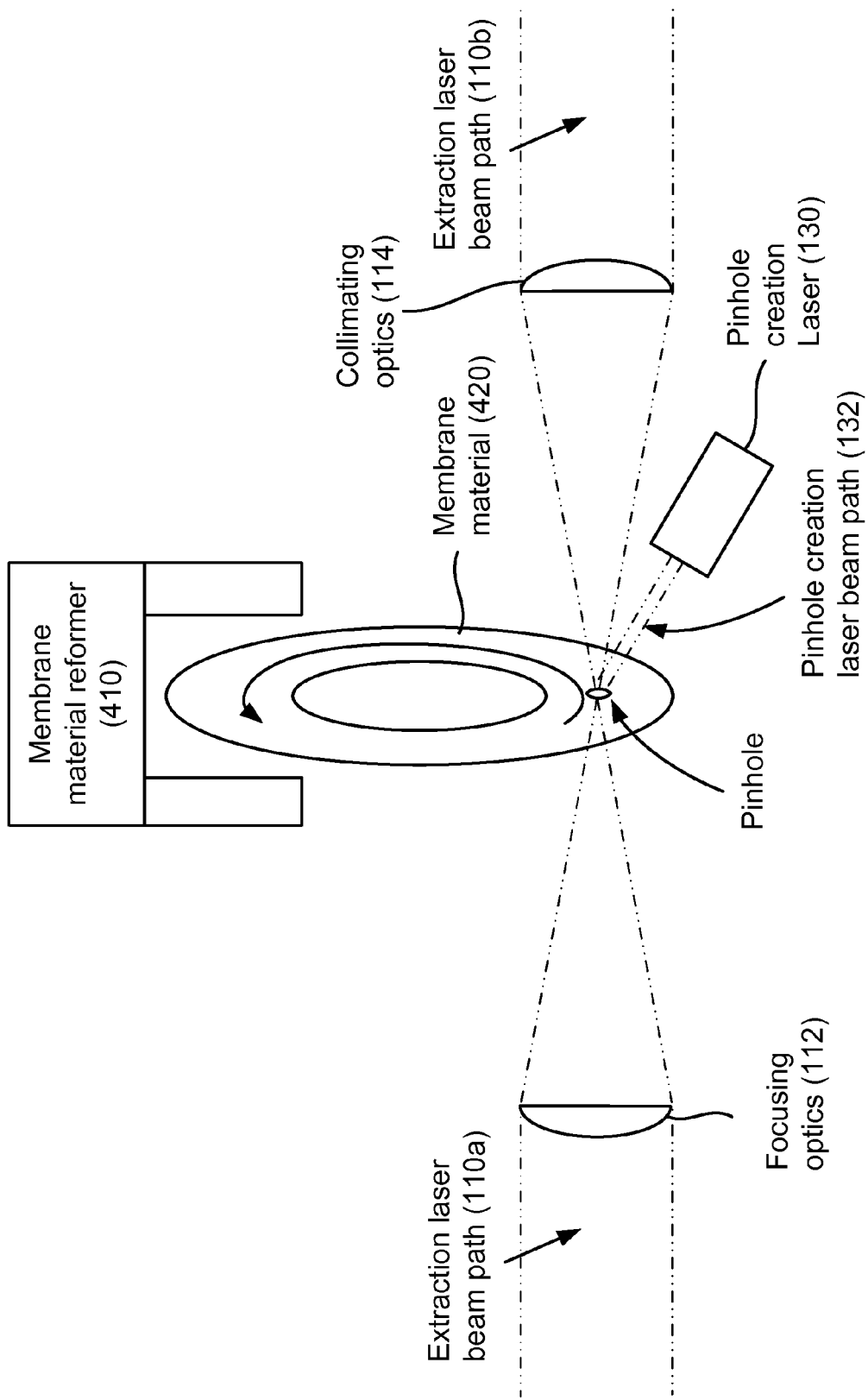
FIG. 4 is a simplified schematic diagram illustrating a modulated pinhole system with a re-formed pinhole material according to an embodiment of the present invention.

FIG. 4 is a simplified schematic diagram illustrating a modulated pinhole system with a re-formed pinhole material according to an embodiment of the present invention. Referring to FIG. 4, common elements from FIG. 1 are indicated with common reference numbers. Rather than using a reel-to-reel mechanism to translate the absorbing material formed as a ribbon of a membrane material, the embodiment illustrated in FIG. 4 utilizes a membrane material 420 that is "self healing". One of several materials may be used as the absorbing material, for example, tin, ice, a malleable material, or the like. At the intersection of the extraction laser beam path and the pinhole creation laser beam path, a pinhole is created in the absorbing material 420 as described throughout the present specification. The membrane material is rotated as illustrated, with the damaged material passing through the membrane material reformer 410. As an example, the damaged absorbing material could pass through an oven and press to reform the material in a manner suitable for future pinhole creation. In this disc-based geometry, the pinhole location and the membrane material reformer 410 are positioned 180° from each other. In another embodiment, a ribbon of material is utilized on a reel-based apparatus, but with the ribbon passing through a reformer and the reformed material being translated back through the pinhole location. Thus, although the disc shape is illustrated in FIG. 4, this is not required by the present invention and other suitable shapes can be utilized according to embodiments of the present invention. Although lasers have been used to create the pinholes in the embodiments illustrated in FIGS. 1 and 4, pinholes can be created by alternate means, such as an electric discharge, microwave impulse, or the like.

Figure 5:
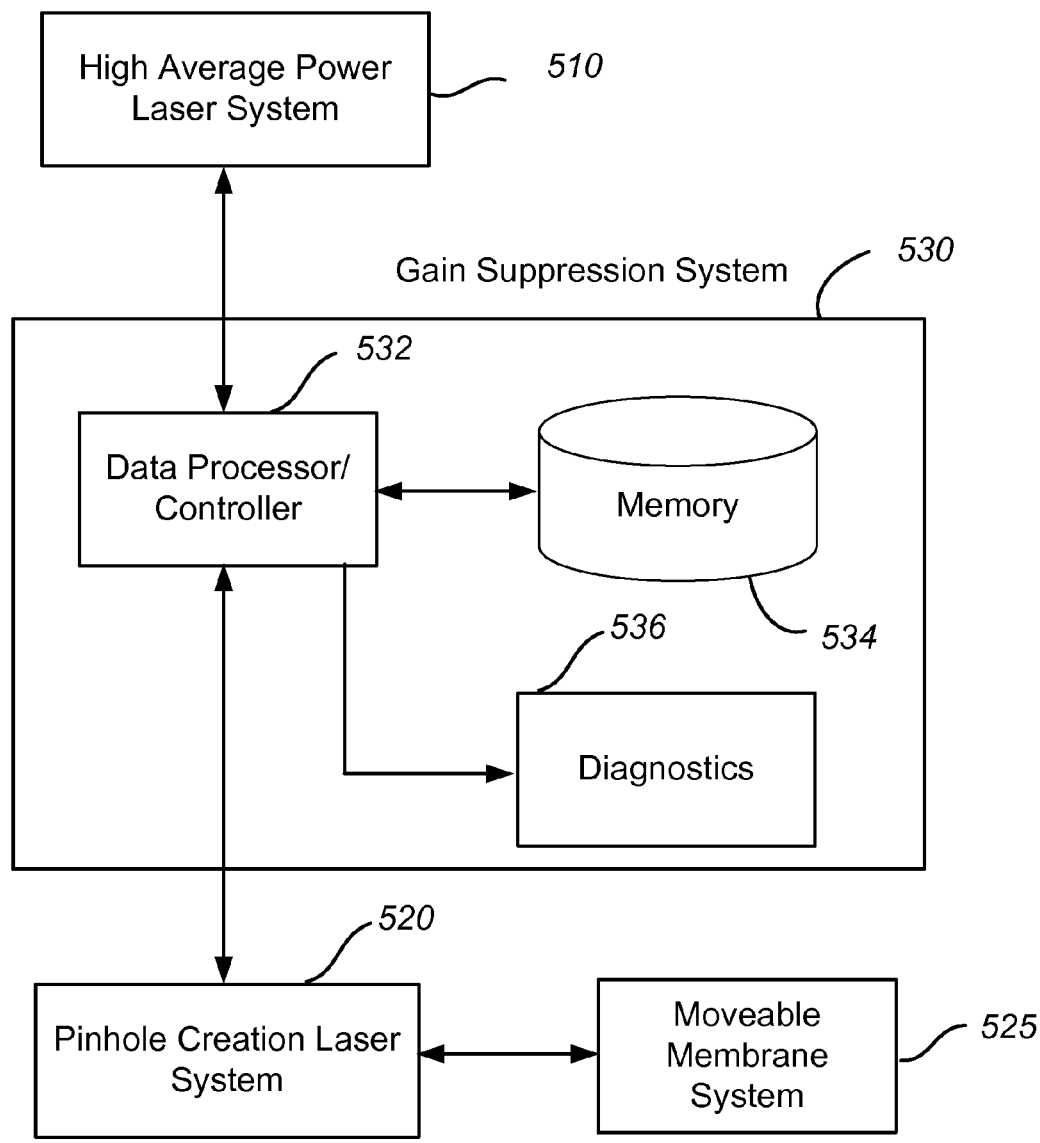
FIG. 5 is a simplified schematic diagram of a gain suppression system according to an embodiment of the present invention.

FIG. 5 is a simplified schematic diagram of a gain suppression system according to an embodiment of the present invention. The gain suppression system 530 provides for modulation of the gain suppression as a function of time as appropriate to pulsed laser applications. A high average power laser system 510 is provided, for example, a Nd:SrF$_2$ laser with an average power output on the order of between 200 KW and 2 MW. The gain suppression system 530 interacts with the high average power laser system 510 using data processor/controller 532, memory 534, and diagnostics 536.

The data processor/controller 532 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like.

The memory 534 can be local or distributed as appropriate to the particular application. Memory 534 may include a number of memories including a main random access memory (RAM) for storage of instructions and data during program execution and a read only memory (ROM) in which fixed instructions are stored. Thus, memory 534 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The gain suppression system also interacts with the pinhole creation laser system 520 and the moveable membrane system 525 to accomplish the methods described herein. As an example, the diagnostics 536 can determine that the gain in a high average power amplifier is suitable for output pulse generation. As an input pulse into the amplifier is triggered, the data processor/controller 532 could trigger the pinhole creation laser system 520 to create a pinhole in the moveable membrane. Thus, as the input pulse is amplified through the high average power amplifier, the pinhole will be created to enable the high average power output pulse to propagate through the system. After the output pulse is generated, the data processor/controller will interact with the moveable membrane system to position new membrane material in the optical path, thereby modulating the gain suppression.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A high average power laser system with modulated gain suppression, the system comprising:
   an input aperture associated with a first laser beam extraction path;
   an output aperture associated with the first laser beam extraction path;
   a pinhole creation laser having a second laser beam directed along a pinhole creation path;
   an absorbing material positioned along both the first laser beam extraction path and the pinhole creation path;
   a mechanism operable to translate the absorbing material in a direction crossing the first laser beam extraction laser path; and
   a controller operable to modulate the second laser beam.

2. The high average power laser system of claim 1 wherein the absorbing material is positioned at the intersection of the first laser beam extraction path and the pinhole creation path.

3. The high average power laser system of claim 1 further comprising a laser gain medium disposed along the first laser beam extraction path.

4. The high average power laser system of claim 1 wherein the absorbing material is positioned between the input aperture and the output aperture.

5. The high average power laser system of claim 1 wherein the mechanism comprises a reel-to-reel assembly.

6. The high average power laser system of claim 1 wherein the mechanism comprises a rotating disc assembly.

7. The high average power laser system of claim 6 further comprising an absorbing material reformer system.

8. The high average power laser system of claim 1 wherein the pinhole creation laser comprises a Nd:SrF$_2$ laser.

9. The high average power laser system of claim 1 wherein the absorbing material comprises at least one of graphite, carbon fiber, plastic, aluminum, steel, or tungsten.

10. A high average power laser system with modulated gain suppression, the system comprising:
- a first laser providing a first laser beam propagating along a first laser beam extraction path;
- an input aperture disposed along the first laser beam extraction path;
- an output aperture disposed along the first laser beam extraction path;
- a second laser having an optical output directed along a pinhole creation path;
- an absorbing material positioned along both the first laser beam extraction path and the pinhole creation path;
- a mechanism operable to translate the absorbing material in a direction crossing the first laser beam extraction laser path; and
- a controller operable to modulate the second laser beam.

11. The high average power laser system of claim 10 wherein the absorbing material is positioned at the intersection of the first laser beam extraction path and the pinhole creation path.

12. The high average power laser system of claim 10 further comprising a laser gain medium disposed along the first laser beam extraction path.

13. The high average power laser system of claim 10 wherein the absorbing material is positioned between the input aperture and the output aperture.

14. The high average power laser system of claim 10 wherein the mechanism comprises a reel-to-reel assembly.

15. The high average power laser system of claim 10 wherein the mechanism comprises a rotating disc assembly.

16. The high average power laser system of claim 15 further comprising an absorbing material reformer system.

17. The high average power laser system of claim 10 wherein first laser comprises a Nd:SrF$_2$ laser.

18. The high average power laser system of claim 10 wherein the second laser comprises a YAG laser.

19. The high average power laser system of claim 10 wherein the absorbing material comprises at least one of graphite, carbon fiber, plastic, aluminum, steel, or tungsten.

\* \* \* \* \*